US009074635B2

(12) United States Patent
Rasmussen

(10) Patent No.: US 9,074,635 B2
(45) Date of Patent: Jul. 7, 2015

(54) YAW DRIVE FOR A YAWING SYSTEM FOR A WIND TURBINE

(71) Applicant: Vestas Wind Systems A/S, Aarhus N. (DK)

(72) Inventor: Lars Vermund Rasmussen, Aarhus C (DK)

(73) Assignee: VESTAS WIND SYSTEMS A/S, Aarhus N (DJ)

( * ) Notice: Subject to any disclaimer, the term of this patent is extended or adjusted under 35 U.S.C. 154(b) by 0 days.

(21) Appl. No.: 14/355,129

(22) PCT Filed: Oct. 29, 2012

(86) PCT No.: PCT/DK2012/050398
§ 371 (c)(1),
(2) Date: Apr. 29, 2014

(87) PCT Pub. No.: WO2013/064151
PCT Pub. Date: May 10, 2013

(65) Prior Publication Data
US 2014/0311851 A1  Oct. 23, 2014

Related U.S. Application Data

(60) Provisional application No. 61/554,009, filed on Nov. 1, 2011.

(30) Foreign Application Priority Data

Oct. 31, 2011 (DK) .................................. 2011 70592

(51) Int. Cl.
F16D 43/21 (2006.01)
F16D 7/02 (2006.01)
F03D 7/02 (2006.01)

(52) U.S. Cl.
CPC .............. *F16D 7/027* (2013.01); *F03D 7/0204* (2013.01); *F16D 43/216* (2013.01); *Y02E 10/723* (2013.01); *F05B 2260/4023* (2013.01); *F05B 2270/335* (2013.01)

(58) Field of Classification Search
CPC ................................................. F05B 2260/4023
USPC .................................. 464/46; 192/56.1, 56.6
See application file for complete search history.

(56) References Cited

U.S. PATENT DOCUMENTS 3,319,751 A * 5/1967 Sacchini ...................... 192/48.3
3,570,638 A * 3/1971 Baker ......................... 192/70.27
(Continued)

FOREIGN PATENT DOCUMENTS

CH 227655 A 6/1943
EP 2280191 A2 2/2011
(Continued)

OTHER PUBLICATIONS

International Searching Authority, International Search Report issued in corresponding PCT Application No. PCT/DK2012/050398 dated Mar. 8, 2013, 4 pages.
(Continued)

*Primary Examiner* — Rodney H Bonck
*Assistant Examiner* — Lillian Nguyen
(74) *Attorney, Agent, or Firm* — Wood, Herron & Evans, LLP

(57) ABSTRACT

A yaw drive for a wind turbine includes a motor, a gear assembly connected to the motor, and a torque limiter. The torque limiter is arranged between the motor and the gear assembly and is capable of transferring torque between the motor and the gear assembly, and capable of limiting torque transfer between the motor and the gear assembly when the torque applied to the torque limiter exceeds a threshold value. A torque transferring part of the torque limiter includes a first set of discs connected to the motor and a second set of discs connected to the gear assembly, the discs of the first set being arranged interleaved with the discs of the second set, thereby forming a stack of discs. A friction between the discs provides torque transfer between the discs. The discs rotate relative to each other when an applied torque overcomes the friction between the discs.

3 Claims, 5 Drawing Sheets

(56) References Cited

U.S. PATENT DOCUMENTS

| | | | |
|---|---|---|---|
| 3,581,601 A * | 6/1971 | Kitano | 475/234 |
| 4,445,876 A * | 5/1984 | Entrup | 464/48 |
| 4,465,267 A * | 8/1984 | Chatelin | 267/161 |
| 4,474,080 A * | 10/1984 | Day | 475/235 |
| 6,918,479 B2 * | 7/2005 | Pahrisch et al. | 192/89.25 |
| 2007/0098549 A1 * | 5/2007 | Nies | 416/44 |
| 2011/0140439 A1 | 6/2011 | Ramanujam | |
| 2012/0201679 A1 * | 8/2012 | Heidenreich et al. | 416/146 R |

FOREIGN PATENT DOCUMENTS

| | | | |
|---|---|---|---|
| JP | 04095618 A * | 3/1992 | F16D 43/21 |
| JP | 2004232500 A | 8/2004 | |

OTHER PUBLICATIONS

Danish Patent Office, Combined search and examination report issued in corresponding DK application No. PA 2011 70592 dated Jun. 14, 2012, 4 pages.

* cited by examiner

YAW DRIVE FOR A YAWING SYSTEM FOR A WIND TURBINE

FIELD OF THE INVENTION

The present invention relates to a yaw drive for a yawing system for a wind turbine. The yaw drive of the invention comprises a torque limiter for limiting torque loads in the yaw drive, thereby reducing wear on the yaw drive.

BACKGROUND OF THE INVENTION

When a yaw drive is operated, a motor provides high speed rotation for an output shaft. The output shaft is connected to an input shaft of a gear assembly. In the gear assembly the rotational speed is reduced, and an output gear wheel of the gear assembly is arranged in engagement with a large gear ring, thereby causing a nacelle of a wind turbine to rotate about a substantially vertical axis.

The motor of the yaw drive is often provided with a brake, such as an electro-magnetic brake, which is used when a yawing movement is to be stopped, and when a yawing position is to be maintained. However, such brakes tend to be inaccurate, thereby providing a too high braking force and introducing loads in the yaw drive, and possibly in the entire yawing system, and even in the entire wind turbine. In order to reduce such loads, some yaw drives have been provided with torque limiters.

A torque limiter allows torque to be transferred between two rotatable parts under normal operating conditions. But in the case that an applied torque exceeds a predefined threshold value, the torque limiter ensures that only torque corresponding to the threshold value is transferred, i.e. the torque being transferred is limited. The torque exceeding the threshold value is absorbed by the torque limiter. Thereby it can be avoided that damaging torque loads are transferred through the system.

Previously torque limiters have been arranged in gear systems, e.g. between two gear stages. One disadvantage of this is that it is necessary to disassemble the gear system in order to provide service or adjustment to the torque limiter.

EP 1 793 143 A1 discloses a gear reducer comprising a torque limiter. The torque limiter is designed to transmit torque, or, once a given threshold value of the torque is exceeded, to cause a crown wheel to slip with respect to a hub. The torque limiter forms part of the gear reducer.

DESCRIPTION OF THE INVENTION

It is an object of embodiments of the invention to provide a yaw drive for a yawing system for a wind turbine, the yaw drive comprising a torque limiter which can be easily maintained.

It is a further object of embodiments of the invention to provide a yaw drive for a yawing system for a wind turbine, the yaw drive comprising a preloaded torque limiter, the preload being adjustable without requiring disassembly of the entire yaw drive.

The present invention provides a yaw drive for a yawing system for a wind turbine, the yaw drive comprising:
  a motor,
  a gear assembly operationally connected to the motor, and
  a torque limiter arranged detachably between the motor and the gear assembly, in such a manner that the torque limiter is capable of transferring torque between the motor and the gear assembly, and the torque limiter being capable of limiting torque transfer between the motor and the gear assembly when the torque applied to the torque limiter exceeds a threshold value,
  wherein a torque transferring part of the torque limiter comprises a first set of discs connected to a rotating output shaft of the motor and a second set of discs connected to a rotating input shaft of the gear assembly, the discs of the first set of discs being arranged interleaved with the discs of the second set of discs, thereby forming a stack of discs, a friction between the discs of the first set of discs and the discs of the second set of discs providing torque transfer between the discs, and the discs being allowed to rotate relative to each other when an applied torque overcomes the friction between the discs, and wherein the torque limiter is provided with a preload mechanism arranged to apply a preload force to the stack of discs in such a manner that the preload force defines the friction between the discs.

In the present context the term 'wind turbine' should be interpreted to mean an apparatus arranged to convert energy contained in wind into electrical energy. The electrical energy may be supplied to a grid.

Modern horizontal axis wind turbines comprise a tower construction mounted on a ground foundation or on an offshore foundation structure. The tower construction carries a nacelle carrying a hub with a number of wind turbine blades, often three wind turbine blades. The hub is mounted rotatably on the nacelle about a substantially horizontal axis in such a manner that the hub rotates as a consequence of the wind turbine blades catching the wind. The nacelle houses various components used for converting this rotational movement into electrical energy, such as a generator and possibly a gear arrangement.

The nacelle is mounted on the tower construction in a rotatable manner, via a yawing arrangement, in order to allow the wind turbine blades to be directed in accordance with the wind direction. The yawing arrangement typically comprises a large toothed ring and one or more yaw drives, each yaw drive comprising a motor driving an output gear wheel arranged in engagement with the large toothed ring, via a gear arrangement. The large toothed ring may be arranged on the tower construction, while the yaw drive(s) is/are mounted on the nacelle. As an alternative, the large toothed ring may be arranged on the nacelle, while the yaw drive(s) is/are mounted on the tower construction. In any event, when the output gear wheel of the yaw drive(s) is/are rotated, the nacelle is rotated due to the engagement between the large toothed ring and the output gear wheel(s) of the yaw drive(s).

The yaw drive of the invention comprises a motor, a gear assembly and a torque limiter. The motor is operationally connected to the gear assembly, i.e. when the motor is operated, the gear assembly is also operated.

The torque limiter is arranged detachably between the motor and the gear assembly. Accordingly, the torque limiter forms a separate unit. Thereby it is possible to perform service or maintenance on the torque limiter, or even to replace the torque limiter, without disassembling the gear assembly or even the entire yaw drive. Furthermore, it is possible to select a lubricant for the torque limiter which is optimal for this purpose, rather than using the lubricant which is used for the gear assembly.

It is also an advantage that the torque limiter is arranged between the motor and the gear assembly, because it is thereby as close as possible to the motor. Thereby the torque provided by to the torque limiter is very small because the rotational speed of the output shaft of the motor is very high. Therefore the required braking moment of the torque is minimised, and the size of the torque limiter can therefore be minimised. If the torque limiter was instead arranged inside the gear assembly, the supplied torque, and thereby the required braking moment, would be increased by an amount corresponding to the gear ratio, and a larger torque limiter would therefore be required.

As described above, the torque limiter is capable of transferring torque between the motor and the gear assembly under normal operating conditions. However, in the case that the applied torque exceeds a threshold value, torque transfer is prevented. Thus, when the applied torque is below the threshold value, the torque limiter transfers torque from the motor to the gear assembly, thereby providing a yawing movement of the nacelle. When the applied torque exceeds the threshold value, the torque limiter ensures that the transferred torque between the motor and the gear system is limited to the threshold value, thereby reducing the loads on the system. For instance, when the motor brake is applied, and no yawing is required, gusts or turbulence may attempt to rotate the nacelle. The torque thereby applied to the gear arrangement of the yaw drive would be transferred to the motor if the yaw drive did not comprise a torque limiter, thereby introducing loads in the yaw drive. However, the torque limiter ensures that such damaging torque loads are not transferred. Instead the gear arrangement is allowed to rotate slightly while the motor remains braked. Thus, the nacelle is allowed to rotate slightly, but in a controlled manner.

The torque transfer and torque limiting described above is obtained in the following manner. A torque transferring part of the torque limiter comprises a first set of discs connected to a rotating output shaft of the motor and a second set of discs connected to a rotating input shaft of the gear assembly. The discs of the first set of discs are arranged interleaved with the discs of the second set of discs, thereby forming a stack of discs, where discs of the first set of discs and discs of the second set of discs are alternatingly arranged. When the rotating output shaft of the motor rotates, the discs of the first set of discs will rotate along. If sufficient friction exists between the discs of the first set of discs and the discs of the second set of discs, this rotating movement, i.e. the torque, will be transferred to the discs of the second set of discs. Thereby the torque is also transferred to the rotating input shaft of the gear assembly, and thereby to the gear assembly.

However, in the case that the friction between the discs of the first set of discs and the discs of the second set of discs is too low, the discs will instead slide relative to each other, and only limited torque will be transferred via the discs. This is the case when an applied torque overcomes the friction between the discs.

The torque limiter is provided with a preload mechanism being arranged to apply a preload force to the stack of discs in such a manner that the preload force defines the friction between the discs. Thereby the preload force also defines the threshold value which determines when the torque limiter transfers torque and when the torque limiter prevents damaging torque transfer. Accordingly, by designing the preload mechanism in such a manner that a suitable preload force is obtained, a suitable threshold value is obtained. Thereby it is ensured that torque is transferred between the motor and the gear arrangement, while avoiding that undesired torque loads are transferred through the system.

The preload mechanism may comprise at least one spring. According to this embodiment, the preload force is provided by the spring(s), and a desired preload force can be selected by selecting a spring with suitable characteristics. As an alternative, the preload force may be provided in other ways, e.g. by means of a hydraulic arrangement.

The preload mechanism may comprise at least one disc spring. In this case the preload force is provided by means of the disc spring(s). The disc spring(s) is/are preferably arranged adjacent to the stack of discs in such a manner that it/they push against the stack, thereby pressing the discs against each other. As an alternative another type of spring may be used, such as a helical or compressible spring.

In the case that the preload mechanism comprises at least one disc spring, at least one of the disc spring(s) may be a slotted disc spring. A slotted disc spring is a disc spring which is provided with cut-outs in the resilient part of the disc. The size, shape and position of these cut-outs affect the spring characteristic of the spring. The spring characteristic of a normal disc spring is substantially linear, i.e. the spring force varies substantially linearly as a function of movement of the resilient part of the disc. However, the spring characteristic of a slotted disc spring comprises a region where the spring force is a substantially constant function of movement of the resilient part of the disc, i.e. the spring force remains invariable if the resilient part of the disc spring is moved within this region. When the disc spring(s) is/are arranged adjacent to the stack of discs as described above, wear on the discs of the stack of discs causes the stack to be compressed slightly, and thereby the resilient part of the disc spring(s) is also moved slightly. If slotted disc springs are used instead of normal disc springs, this will not affect the spring force, i.e. the preload force applied to the stack of discs remains invariable. This is a great advantage because a reliable and known preload force is thereby applied to the stack of discs during a significant part of the lifetime of the torque limiter, and accordingly the threshold value is therefore also kept substantially constant. Therefore, the slotted spring discs are very suitable for providing a preload force in a torque limiter for a yaw drive according to the invention.

According to one embodiment, the preload force may, at least in a region, be substantially constant, regardless of an amount of wear on the discs. As described above, this may, e.g., be obtained by using one or more slotted disc springs for providing the preload force.

Alternatively, this may, e.g., be obtained by controlling a hydraulic preload system in a suitable manner. As described above, this is an advantage, because a reliable and known preload force can thereby be maintained during a significant part of the lifetime of the torque limiter.

The yaw drive may further comprise an adjusting mechanism, wherein operation of the adjusting mechanism may cause the preload force to be adjusted. According to this embodiment it is possible to adjust the preload force applied to the stack of discs, by means of the adjusting mechanism. This may, e.g., be necessary in the case of wear on the discs of the stack of discs, or if it is desired to adjust the threshold value.

According to one embodiment, it may be possible to operate the adjusting mechanism without detaching the torque limiter from the yaw drive. This is an advantage, because the adjustment process can thereby be performed easily and quickly, thereby reducing down time for the wind turbine.

BRIEF DESCRIPTION OF THE DRAWINGS

The invention will now be described in further detail with reference to the accompanying drawings in which.

DETAILED DESCRIPTION OF THE DRAWINGS

Figure 1:
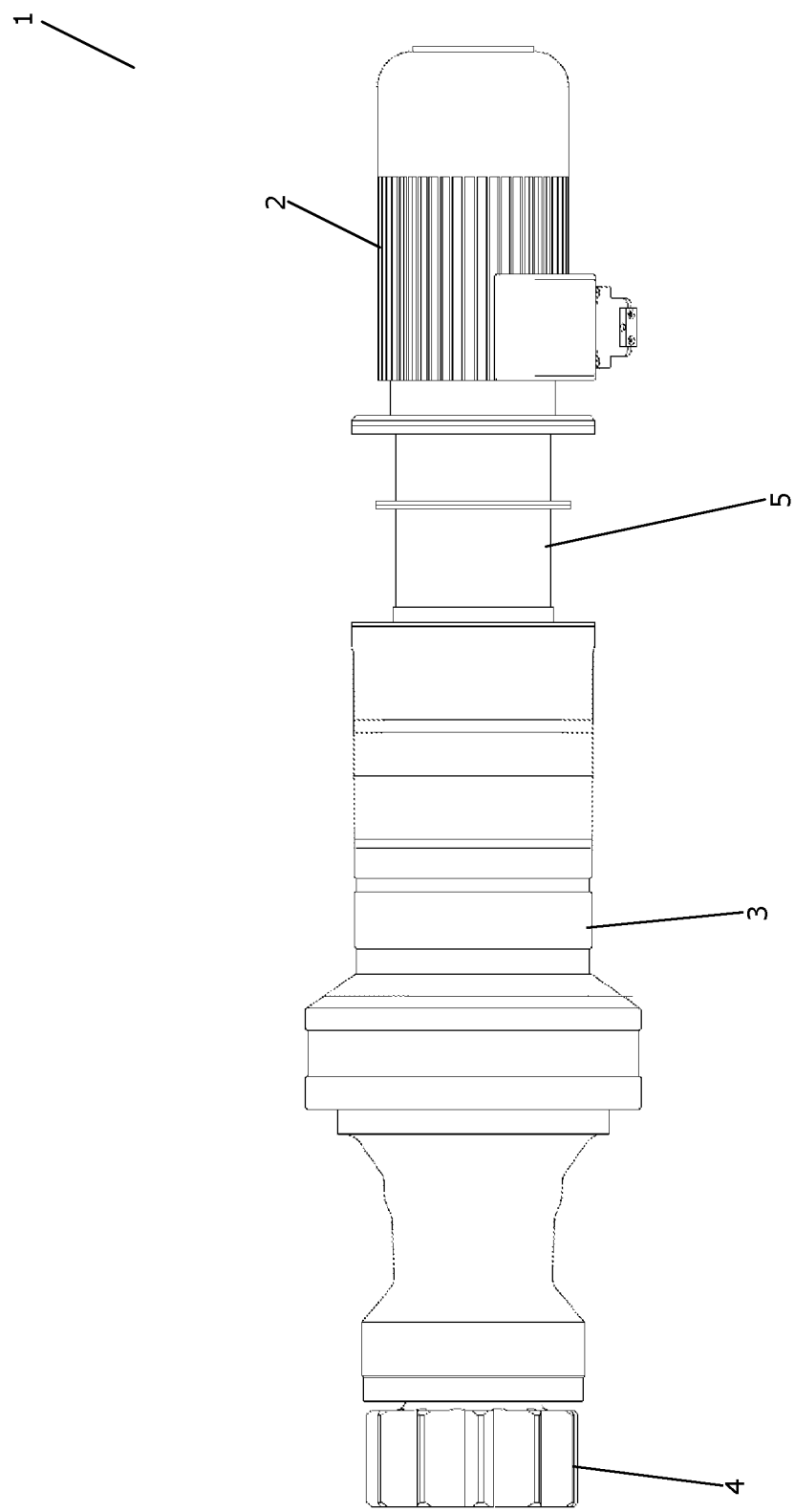
FIG. 1 is a side view of a yaw drive according to an embodiment of the invention.

FIG. 1 is a side view of a yaw drive 1 according to an embodiment of the invention. The yaw drive 1 comprises a motor 2 and a gear arrangement 3. An output gear wheel 4 can be arranged in engagement with a large toothed gear ring, rotations of the output gear wheel 4 thereby causing a yawing movement of a nacelle as described above.

A torque limiter 5 is arranged between the motor 2 and the gear arrangement. Thus, during normal operation of the yaw drive 1, torque is transferred from the motor 2 to the gear arrangement 3, via the torque limiter 5. However, when a torque is applied to the torque limiter which exceeds a predefined threshold, the torque limiter 5 prevents damaging torque loads from being transferred between the motor 2 and the gear arrangement 3. Thereby undesired torque loads in the system are prevented. This will be described in further detail below.

The torque limiter 5 forms a separate unit. Thereby it is possible to perform service or maintenance on the torque limiter 5 without disassembling the yaw drive 1. Furthermore, the torque limiter 5 can easily be replaced, if required. Finally, the torque limiter 5 may be fitted onto existing yaw drives, without requiring substantial changes to the motor or the gear arrangement.

Figure 2:
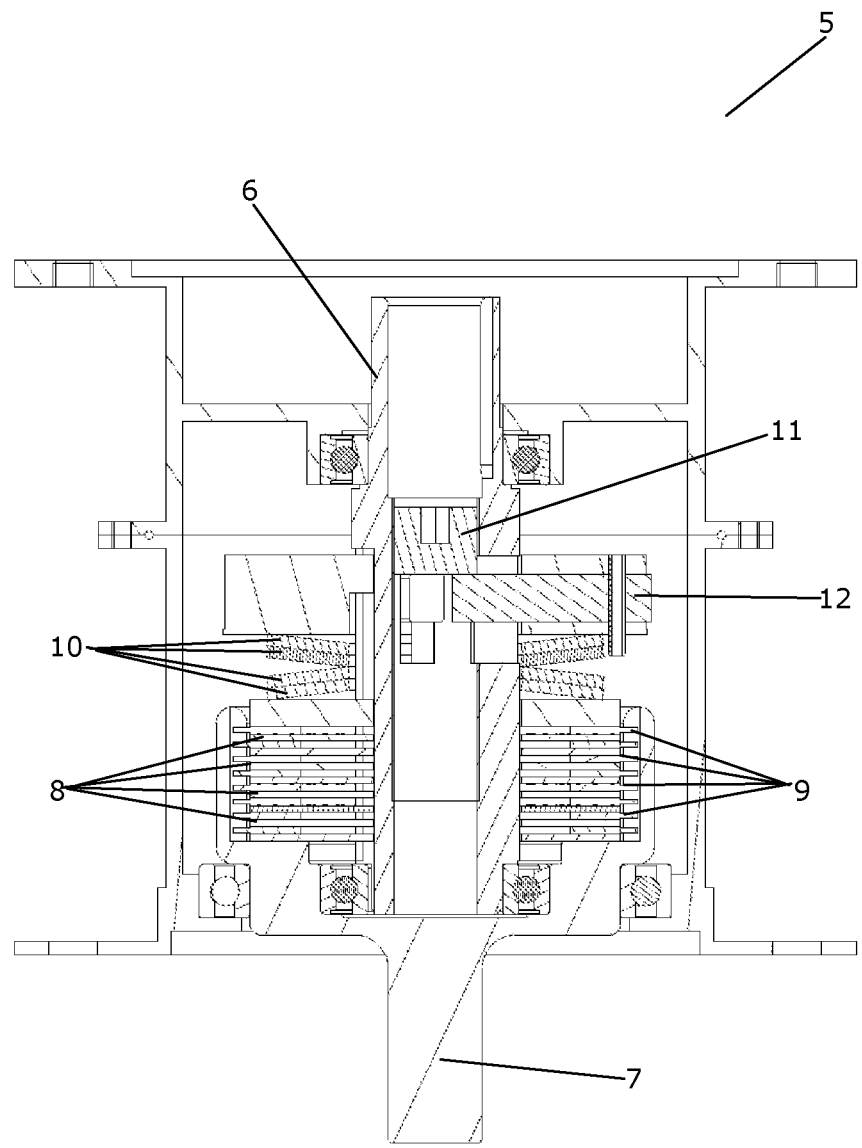
FIG. 2 is a cross sectional view of a torque limiter for a yaw drive according to a first embodiment of the invention.

FIG. 2 is a cross sectional view of a torque limiter 5 for a yaw drive 1 according to a first embodiment of the invention. The torque limiter 5 comprises an input shaft 6 connectable to an output shaft of a motor and an output shaft 7 connectable to an input shaft of a gear arrangement.

Eight discs 8, forming a first set of discs, are attached to the input shaft 6, and eight discs 9, forming a second set of discs, are attached to the output shaft 7. The discs 8 forming the first set of discs and the discs 9 forming the second set of discs are arranged interleaved in such a manner that a stack of discs is formed. Thereby, when the input shaft 6 is rotated, by means of the motor, the discs 8 of the first set of discs rotate along. Due to friction between the discs 8 of the first set of discs and the discs 9 of the second set of discs, the rotational movement is transferred to the discs 9 of the second set of discs, i.e. torque is transferred. Since the discs 9 of the second set of discs are attached to the output shaft 7, the output shaft 7 also rotates. Accordingly, torque is transferred from the motor to the gear arrangement, via the input shaft 6, the discs 8, 9 and the output shaft 7.

However, in the case that a torque is applied to the input shaft 6 or to the output shaft 7 which overcomes the friction between the discs 8, 9, then the discs 8, 9 will slide relative to each other, i.e. only limited torque will be transferred in this case. This prevents undesired torque loads from being transferred through the system.

Four disc springs 10 are arranged adjacent to the stack of discs in such a manner that they provide a preload force to the stack of discs, thereby pushing the discs 8 of the first set of discs and the discs 9 of the second set of discs towards each other, thereby increasing the friction between the discs 8, 9. Accordingly, the preload force provided by the disc springs 10 defines the friction between the discs 8, 9, and thereby it also defines a threshold torque determining when maximum torque is transferred through the torque limiter 5 and when such torque transfer is limited.

A shaft nut 11 is arranged inside the input shaft 6. The shaft nut 11 may be rotated, via a threaded connection, by means of a tool. When the shaft nut 11 is rotated in such a manner that it moves, via the threaded connection, in a direction towards the stack of discs, it pushes a preload beam 12 towards the disc springs 10. This increases the preload force provided by the disc springs 10 to the stack of discs, thereby increasing the friction between the discs 8, 9, as described above. Thus, the preload force can be adjusted without disassembling the torque limiter 5.

Figure 3:
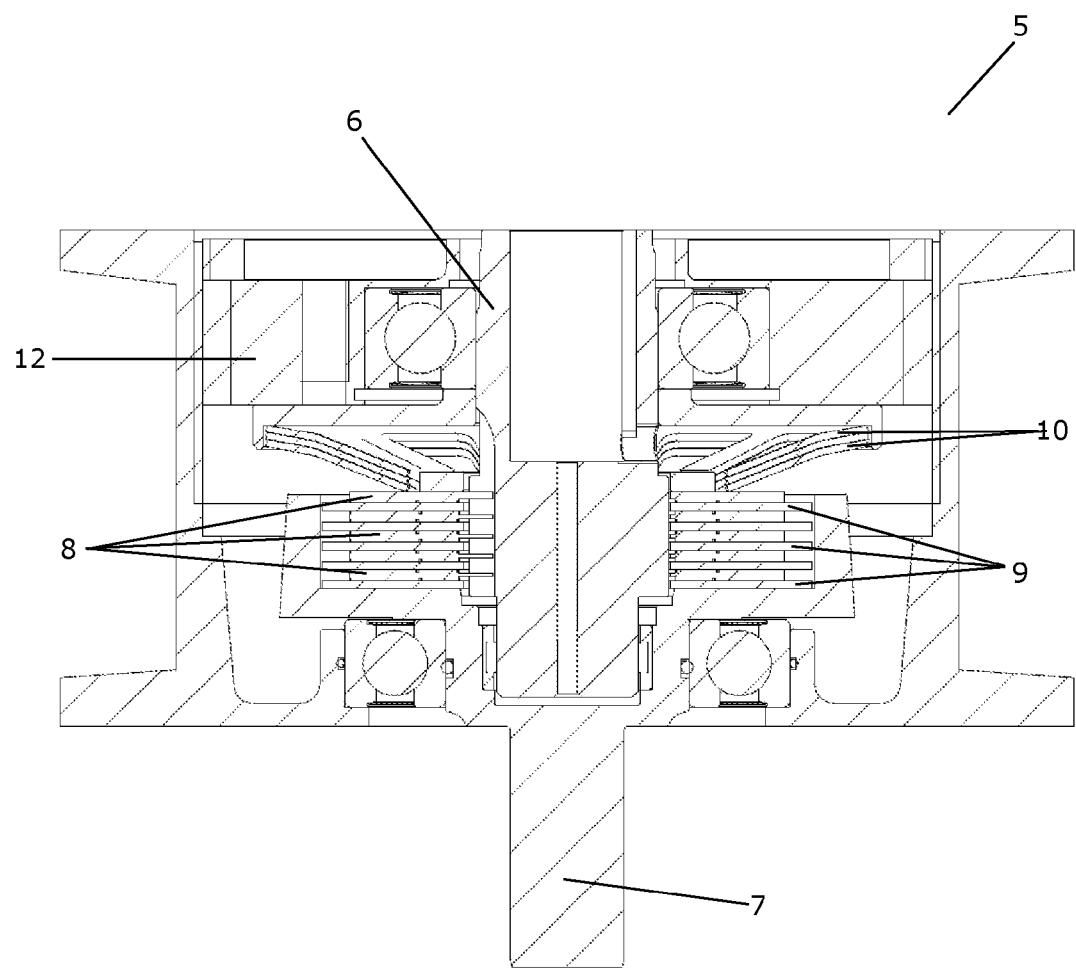
FIG. 3 is a cross sectional view of a torque limiter for a yaw drive according to a second embodiment of the invention.

FIG. 3 is a cross sectional view of a torque limiter 5 for a yaw drive 1 according to a second embodiment of the invention. Similarly to the torque limiter 5 of FIG. 2, the torque limiter 5 of FIG. 3 also comprises an input shaft 6, an output shaft 7 and a stack of interleaved discs 8, 9, arranged to transfer torque between the input shaft 6 and the output shaft 7, or to prevent such torque transfer in the manner described above.

The torque limiter 5 is provided with three disc springs 10, arranged to provide a preload force to the stack of discs. The disc springs 10 shown in FIG. 3 are slotted disc springs, i.e. they are provided with cut-outs. This will be described in further detail below with reference to FIGS. 4 and 5.

A preload beam 12 is mounted in the torque limiter 5 via a threaded connection. Thereby the entire preload beam 12 can be rotated in a direction towards or away from the disc springs 10, thereby adjusting the preload force provided by the disc springs 10, similarly to the situation described above with reference to FIG. 2.

Figure 4:
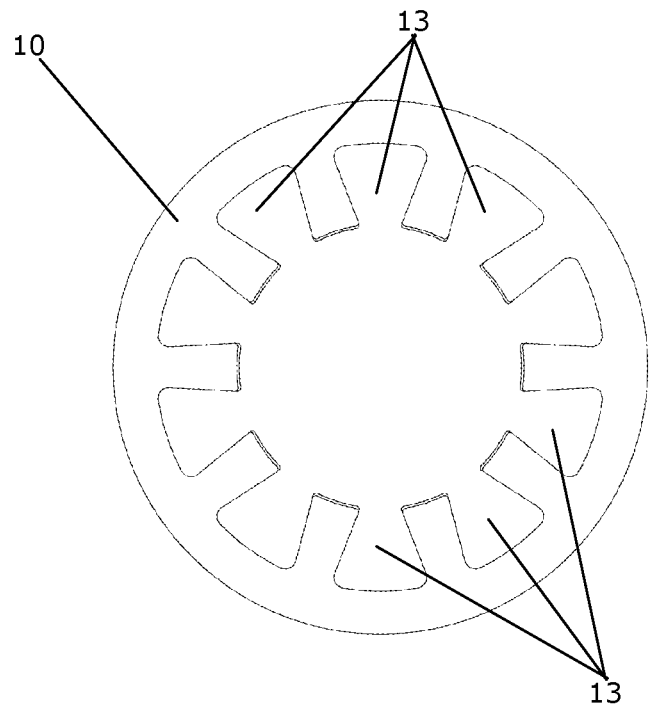
FIGS. 4 and 5 illustrate a slotted disc spring for use in a torque limiter for a yaw drive according to an embodiment of the invention.
Figure 5:
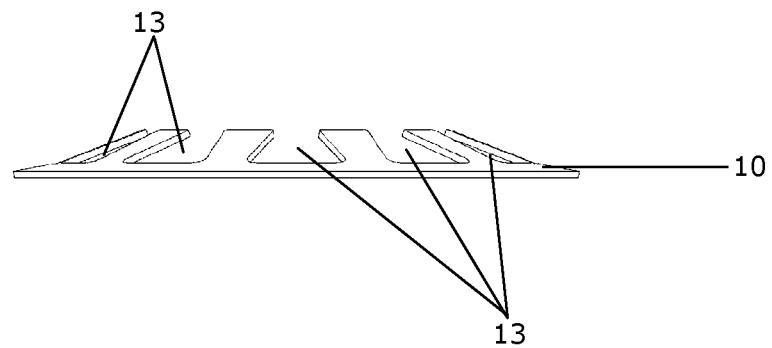

FIGS. 4 and 5 show a slotted disc spring 10 of the kind used in the torque limiter 5 of FIG. 3. In FIG. 4 the disc spring is shown from above, and in FIG. 5 the disc spring 10 is shown from the side.

The resilient part of the disc spring 10 is provided with ten cut-outs 13. This changes the characteristic of the disc spring 10. By selecting the number, size and shape of the cut-outs 13 in a careful manner, a desired characteristic for the disc spring 10 can be obtained.

Figure 6:
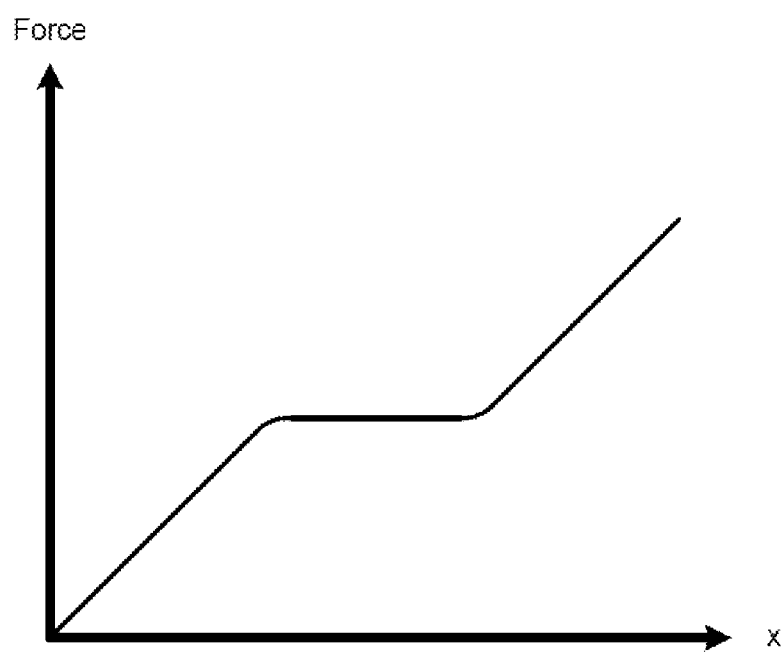
FIG. 6 is a graph illustrating the spring characteristic for the slotted disc spring of FIGS. 4 and 5.

FIG. 6 is a graph illustrating the characteristic of the slotted disc spring 10 of FIGS. 4 and 5. The graph shows preload force as a function of displacement of the resilient part of the disc spring 10. It can be seen from the graph, that there is a region where the provided preload force is substantially constant, even though the displacement is altered. In the case of wear on the discs 8, 9 of the stack of discs, the springs 10 will be moved slightly. When the springs 10 are within the substantially constant region, such movement will not affect the preload force provided by the springs 10. Accordingly, a reliant and substantially constant preload force is obtained, by using slotted spring discs 10, regardless of the wear on the discs 8, 9. This makes the slotted spring disc 10 very suitable for use in a torque limiter 5 for a yaw drive 1 according to the invention.

The invention claimed is:

1. A yaw drive for a yawing system for a wind turbine, the yaw drive comprising:
    a motor,
    a gear assembly operationally connected to the motor, and
    a torque limiter arranged detachably between the motor and the gear assembly, in such a manner that the torque limiter is capable of transferring torque between the motor and the gear assembly, and the torque limiter being capable of limiting torque transfer between the motor and the gear assembly when the torque applied to the torque limiter exceeds a threshold value,
    wherein a torque transferring part of the torque limiter comprises a first set of discs connected to a rotating output shaft of the motor and a second set of discs connected to a rotating input shaft of the gear assembly, the discs of the first set of discs being arranged interleaved with the discs of the second set of discs, thereby forming a stack of discs, a friction between the discs of the first set of discs and the discs of the second set of discs providing torque transfer between the discs, and the discs being allowed to rotate relative to each other when an applied torque overcomes the friction between the discs, and wherein the torque limiter is provided with a preload mechanism arranged to apply a preload force to the stack of discs in such a manner that the preload force defines the friction between the discs, and wherein the preload mechanism comprises at least one disc spring configured as a slotted disc spring, the slotted disc spring having a plurality of cutouts along an inner edge to define a plurality of radially-extending fingers, and the slotted disc spring being characterized as having a region where the preload force provided by the slotted disc spring is substantially constant over a range of spring deflections to thereby provide a substantially constant preload force as the discs wear with use.

2. The yaw drive according to claim 1, further comprising an adjusting mechanism, wherein operation of the adjusting mechanism causes the preload force to be adjusted.

3. The yaw drive according to claim 2, wherein the adjusting mechanism can be operated without detaching the torque limiter from the yaw drive.

* * * * *